United States Patent
Clavel et al.

(10) Patent No.: US 9,755,847 B2
(45) Date of Patent: *Sep. 5, 2017

(54) METHOD AND SYSTEM FOR SHARING AND DISCOVERY

(71) Applicant: Rabbit, Inc., San Francisco, CA (US)

(72) Inventors: Philippe Clavel, San Francisco, CA (US); Timophey Zaitsev, San Francisco, CA (US); Stefan Birrer, San Francisco, CA (US); Alexandre Francois, San Francisco, CA (US)

(73) Assignee: Rabbit, Inc., Redwood City, CA (US)

( * ) Notice: Subject to any disclaimer, the term of this patent is extended or adjusted under 35 U.S.C. 154(b) by 930 days.

This patent is subject to a terminal disclaimer.

(21) Appl. No.: 14/134,240

(22) Filed: Dec. 19, 2013

(65) Prior Publication Data

US 2014/0173430 A1    Jun. 19, 2014

Related U.S. Application Data

(60) Provisional application No. 61/739,544, filed on Dec. 19, 2012, provisional application No. 61/777,275, filed on Mar. 12, 2013.

(51) Int. Cl.
    *H04L 12/18*    (2006.01)
(52) U.S. Cl.
    CPC ................. *H04L 12/1822* (2013.01)
(58) Field of Classification Search
    CPC .................................................. H04L 12/1822
    USPC ....... 348/14.01, 14.08, 14.09, 484; 379/67.1, 379/202.01; 381/74; 455/414.1; 704/251, 258; 709/204, 206, 225, 231; 715/706, 758; 725/34; 700/94
    See application file for complete search history.

(56) References Cited

U.S. PATENT DOCUMENTS

| | | |
|---|---|---|
| 5,420,860 A | 5/1995 | Stevens et al. |
| 5,533,112 A | 7/1996 | Danneels |
| 6,212,548 B1 | 4/2001 | Desimone et al. |
| 6,480,885 B1 | 11/2002 | Olivier |
| 6,519,771 B1 | 2/2003 | Zenith |
| 6,697,476 B1 | 2/2004 | O'Malley et al. |
| 6,813,360 B2 | 11/2004 | Gentle |
| 7,068,792 B1 | 6/2006 | Surazski et al. |
| 7,328,242 B1 | 2/2008 | Mccarthy et al. |
| 7,379,961 B2 | 5/2008 | Matsuoka |
| 7,536,705 B1 | 5/2009 | Boucher et al. |
| 7,590,231 B2 | 9/2009 | Tighe et al. |
| 7,742,587 B2 | 6/2010 | Cohen |
| 7,945,006 B2 | 5/2011 | Chen et al. |
| 7,945,620 B2 | 5/2011 | Bou-Ghannam et al. |
| 7,949,117 B2 | 5/2011 | Jeong et al. |

(Continued)

*Primary Examiner* — Gerald Gauthier
(74) *Attorney, Agent, or Firm* — Baker Botts L.L.P.

(57) ABSTRACT

A method for sharing media within a chat room system, including: in response to receipt of a sharing selection from a user at a device, rerouting an audio output from a default audio output of the device to a virtual audio output, capturing a primary audio stream generated by an application executed on the device with the virtual audio output, sending the primary audio stream to an external server for distribution to secondary user devices, receiving a secondary audio stream from the external server and concurrently playing the primary audio stream and secondary audio stream at an audio output of the device.

20 Claims, 8 Drawing Sheets

(56) References Cited

U.S. PATENT DOCUMENTS

| | | |
|---|---|---|
| 8,001,184 B2 | 8/2011 | Etgen et al. |
| 8,006,191 B1 | 8/2011 | Anderson |
| 8,009,619 B1 | 8/2011 | Clavel et al. |
| 8,126,129 B1 | 2/2012 | Mcguire |
| 8,169,916 B1 | 5/2012 | Pai et al. |
| 8,223,185 B2 * | 7/2012 | Gratton .................. H04H 60/80 348/14.01 |
| 8,271,579 B2 | 9/2012 | Clavel |
| 8,412,171 B2 | 4/2013 | Agarwal et al. |
| 8,433,813 B2 | 4/2013 | Garcia, Jr. et al. |
| 8,443,041 B1 | 5/2013 | Krantz et al. |
| 8,448,073 B2 | 5/2013 | Nimon et al. |
| 8,456,508 B2 | 6/2013 | Jeong et al. |
| 8,458,245 B1 | 6/2013 | Marks |
| 8,477,661 B2 | 7/2013 | Saleem et al. |
| 8,482,593 B2 | 7/2013 | Periyannan et al. |
| 8,491,386 B2 | 7/2013 | Reiss et al. |
| 8,683,068 B2 * | 3/2014 | Jalili ................. G06F 17/30056 709/217 |
| 8,972,262 B1 * | 3/2015 | Buryak .................. G10L 15/28 704/251 |
| 9,001,178 B1 * | 4/2015 | Leske .................... H04N 7/155 348/14.08 |
| 2002/0167608 A1 * | 11/2002 | Szybiak ........... H04N 21/23424 348/484 |
| 2003/0014489 A1 * | 1/2003 | Inala ....................... H04L 29/06 709/204 |
| 2004/0078444 A1 * | 4/2004 | Malik .................. G06Q 10/107 709/206 |
| 2007/0050716 A1 * | 3/2007 | Leahy .................. H04L 65/403 715/706 |
| 2007/0244987 A1 | 10/2007 | Pedersen et al. |
| 2009/0037006 A1 * | 2/2009 | Hiratsuka ............ G11B 27/034 700/94 |
| 2009/0251488 A1 | 10/2009 | Clavel |
| 2010/0058381 A1 * | 3/2010 | Begeja ............... H04N 21/6408 725/34 |
| 2011/0016204 A1 | 1/2011 | Wiener et al. |
| 2011/0066438 A1 * | 3/2011 | Lindahl ................. G10L 13/033 704/258 |
| 2011/0082943 A1 | 4/2011 | Ha et al. |
| 2011/0091029 A1 * | 4/2011 | LeBlanc ................. H04M 3/562 379/202.01 |
| 2011/0138069 A1 | 6/2011 | Momchilov et al. |
| 2011/0223893 A1 * | 9/2011 | Lau ........................ G10L 15/22 455/414.1 |
| 2012/0014533 A1 * | 1/2012 | Gough .................... G06F 3/165 381/74 |
| 2012/0069137 A1 * | 3/2012 | Thapa ...................... H04N 7/15 348/14.08 |
| 2012/0268553 A1 * | 10/2012 | Talukder ............. H04L 12/1818 348/14.08 |
| 2013/0138810 A1 * | 5/2013 | Binyamin .............. H04L 41/50 709/225 |
| 2014/0064471 A1 * | 3/2014 | Krishnan .............. H04M 3/567 379/202.01 |
| 2014/0168354 A1 * | 6/2014 | Clavel .................... H04N 7/152 348/14.09 |
| 2014/0173467 A1 * | 6/2014 | Clavel ................. H04L 12/1822 715/758 |
| 2016/0236097 A1 * | 8/2016 | Sullivan .................. A63F 13/12 |

\* cited by examiner

METHOD AND SYSTEM FOR SHARING AND DISCOVERY

CROSS-REFERENCE TO RELATED APPLICATIONS

This application claims the benefit of U.S. Provisional Application No. 61/739,544 filed 19 Dec. 2012 and U.S. Provisional Application No. 61/777,275 filed 12 Mar. 2013, which are incorporated in its entirety by this reference.

TECHNICAL FIELD

This invention relates generally to the social media field, and more specifically to a new and useful chat room system in the social media field.

BACKGROUND

Conventional chat rooms prohibit users from discovering new users and content that is being shared within simultaneously occurring conversations. This is due to the insular nature of conventional chat rooms—each conventional chat room only supports a single conversation, and users within the chat room are unable to simultaneously participate in multiple conversations without actively entering separate, insular chat rooms. Without notification of the user to the existence of these other conversations, users are not even aware that there are other conversations that can be joined. Past attempts at resolving this discovery issue have been made, but these solutions are inadequate because users cannot control which conversations they are joining, and therefore do not have control over which new users or what new content they will be consuming.

Thus, there is a need in the social media field to create a new and useful chat room system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
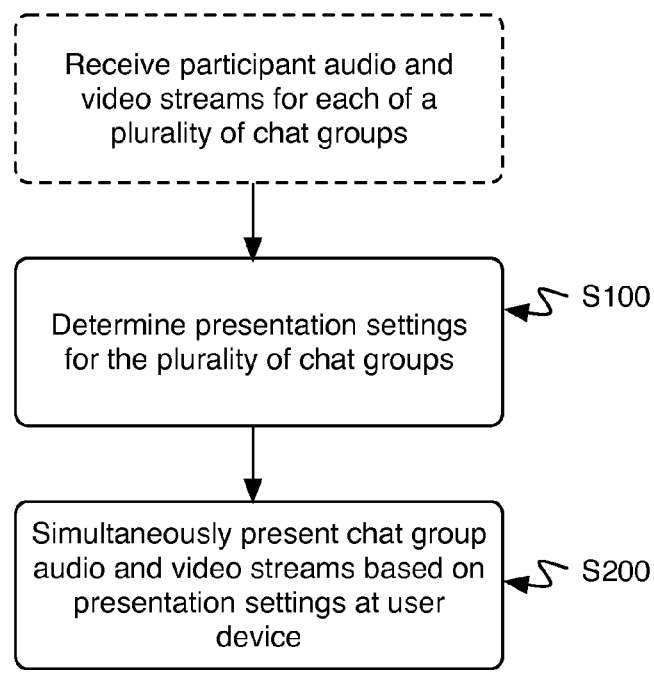
FIG. 1 is a schematic representation of a method for facilitating user and content discovery.

As shown in FIG. 1, the method for facilitating user and content discovery within a chat room includes determining a presentation setting for each of a set of chat groups S100 and simultaneously presenting the audio and video streams for each of the set of chat groups based on the presentation settings S200. The method can additionally include adjusting a chat group priority in response to a user action S300. The method functions to facilitate discovery of new users and new content within a chat room environment by enabling a user to simultaneously participate in multiple conversations. User participation in a conversation preferably includes listening to and/or watching a conversation, and can additionally include contributing audio and/or video to the conversation.

The method is preferably performed by one or more user devices 10 connected to one or more servers 20. The user device 10 is preferably a portable device, such as a smartphone, laptop, tablet, or any other suitable portable user device. Alternatively, the user device 10 can be a desktop or any other suitable computing device. The device 10 preferably includes an audio output 12, more preferably an audio device such as a speaker, but can alternatively include audio out jacks or any other suitable audio output. The device 10 preferably includes a processor, wherein the primary and routing modules are preferably located on the processor, such that the processor performs the actions of the primary and/or routing modules. Alternatively, the device 10 can include multiple processors or multiple threads, wherein the functions of the primary module and routing module can be performed by separate processors or separate threads. The device 10 can additionally include an audio input, such as a microphone, audio in jack, or any other suitable audio input. The device 10 can additionally include a display 14. The device 10 can additionally include a communication connection, such as a wireless receiver and transmitter, that functions to transfer and receive audio and/or video data to a receiver and transmitter pair linked to a server. However, the device 10 can alternatively include any other suitable component. The originating device and receiving devices preferably include substantially the same components described above, but can alternatively include different combinations of components.

The server 20 preferably includes a CPU and storage. The server is preferably external and separate from the user device, but can alternatively be a second user device (e.g., in a distributed network). The server 20 preferably stores and tracks the properties of each of a plurality of chat rooms within a chat system, and can additionally store and track the properties of each of a plurality of chat groups within each chat room. The server 20 can additionally receive the audio and video of each participating user from the respective user device (originating devices), and send the audio and video to the devices of the other users participating in the chat group (receiving devices). The server 20 can additionally synchronize the audio and video. Alternatively, the user device 10 can synchronize the audio and video. Alternatively, the receiving device can directly receive the audio and video from the originating devices. The user device 10 is preferably connected to the server 20 wirelessly (e.g., through WiFi, a cellular network, etc.), but can alternatively be connected to the server 20 through a wired connection.

The method is preferably facilitated by a primary native application that is executed by the user device, gathers the requisite data from the user device, and facilitates interaction with the server. The primary native application is preferably an executable that runs on the user device without external support, but can alternatively be a browser application, a browser plugin, a web-based system, a mobile application, or any other suitable software or data format that is supported by the user device system with minimal computational overhead or additional components. The primary native application is preferably capable of accessing the data of other native applications through the respective application programming interfaces, and is preferably capable of accessing lower-level computational data, such as processor-level data. However, the method can be facilitated by a non-native application, such as a browser plug-in, a browser displaying the mixed audio and video received from an external server, or by any other suitable means. The user profile, user history, social network connections, and any other suitable user information is preferably stored by the user device (e.g., native application), but can alternatively be stored by the server in association with a user account identifier.

In use, the chat system preferably presents one or more chat rooms 30 to a user on the user device 10. In response to receipt of a chat room selection, a set of chat groups 40 of the chat room are preferably displayed, wherein the audio and video streams of the chat groups are preferably presented to varying degrees. The displayed set of chat groups 40 are preferably a subset of the plurality of chat room chat groups (e.g., wherein the subset is smaller than the plurality), but can alternatively be all chat groups or any other suitable portion of the plurality. In response to receipt of a chat group selection, the audio streams 52 and video streams 54 of the users participating in the chat group are preferably presented at the user device, while the audio and video streams of secondary chat groups (e.g., unselected chat groups) are presented to varying degrees on the user device. More preferably, the user device preferably concurrently displays the participant video streams 54 of the users participating in the selected chat group 50, the chat group video stream 44 of the selected chat group, and the chat group video streams 44 of secondary chat groups, and concurrently plays the audio streams 52 of the users participating in the selected chat group and the dampened audio streams of all the chat room chat groups. However, the audio and video of the chat room chat groups can be otherwise concurrently presented.

Figure 3:
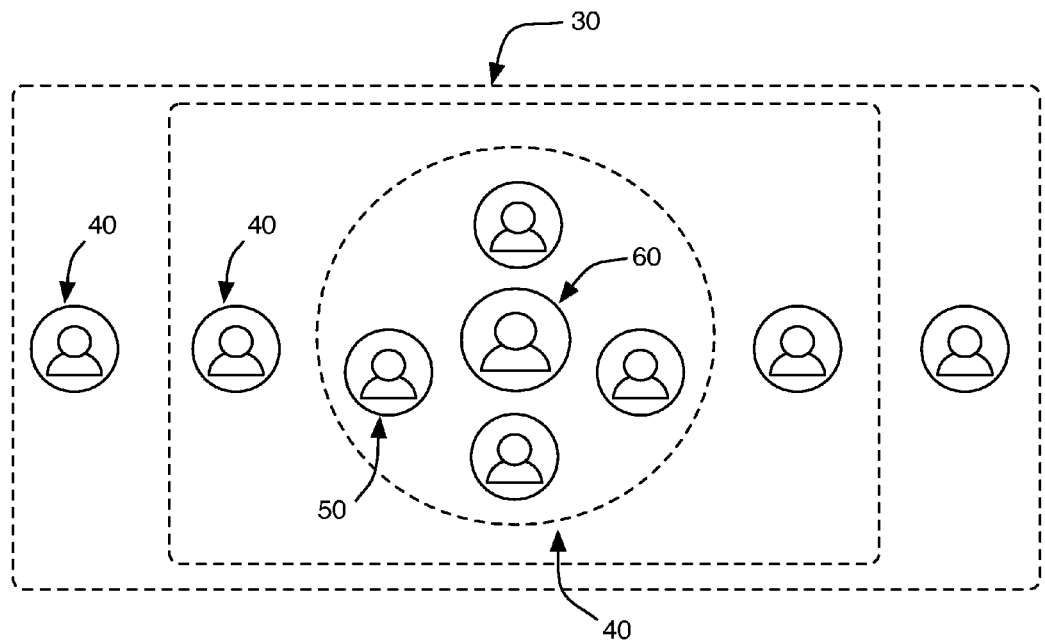
FIG. 3 is a schematic representation of an example of virtual chat group positions within a virtual chat room.

As shown in FIG. 3, the chat room of the method is preferably a virtual chat room (e.g., digital chat room), wherein each chat room includes one or more chat groups (e.g., virtual or digital chat groups). The chat room is preferably one of many chat rooms supported by a chat room system, wherein the system is preferably capable of storing and managing an unlimited number of chat rooms, but can alternatively store and manage a limited number of chat rooms. The chat rooms are preferably substantially insular, such that users inside a chat room are not simultaneously participating in other chat rooms. For example, a user in a first chat group within a first chat room can hear and/or see audio and video streams of other users within other chat groups in the first chat room, but cannot hear or see the audio and video streams of users in other chat rooms. However, users outside of a chat room are preferably capable of participating in the chat room, wherein the outside users are preferably capable of listening to an associated audio stream and an associated video stream. Each chat room is preferably capable of supporting any suitable number of users, but can alternatively support a limited number of users. The chat rooms are preferably substantially persistent within the system, but can alternatively be transient and be deleted in response to a termination event (e.g., no users are in the chat room, the chat room creator has left the chat room, etc.).

Each chat room preferably includes associated permissions settings and presentation settings. The permissions settings can include access settings (e.g., which users can access the chat room, such as private or private chat rooms, etc.), content sharing settings (e.g., which users can share content in the chat room), or any other suitable permissions settings. The permissions settings are preferably set by the creator of the chat room, but can alternatively be set by default when the chat room is created. The permissions settings are preferably managed or changed by the creator or moderator of the chat room, but can alternatively be managed or changed automatically by the server or by another user. The permissions settings are preferably stored by the server, but can alternatively be stored on the device by the primary native application.

The presentation settings for the chat rooms are preferably determined in a similar manner to presentation setting determination for the chat group, as described below. However, the presentation settings can be determined based on the priorities of the chat groups within the chat room or determined in any other suitable manner. The presentation settings are preferably used to determine the aural and visual properties of chat room presentation to the user, prior to chat room selection. Chat room presentation parameters can include a representative audio stream selection, a representative video stream selection, the size of the displayed video stream relative to other chat rooms, the volume of the audio stream, the discernability of the audio stream, the virtual position of the chat room on the user display, or any other suitable presentation settings. The representative video stream is preferably the video stream of the chat group having the highest priority to the user within the respective chat room, but can alternatively be a randomly selected video stream, include multiple concurrent video streams, or be any other suitable video stream. The representative video stream can be from a singular chat group or can be a compilation from multiple chat groups. The representative audio stream is preferably the audio stream corresponding to the selected video stream, but can alternatively be a compilation of a subset or all of the audio streams from the chat room. The chat room presentation settings can additionally influence how the audio and video of the chat groups are displayed once the user is within the chat room.

A chat group of the chat room preferably includes one or more users having a conversation. Each user is represented within the chat group by a video stream and audio stream received from a user device of the user (participant video stream and participant audio stream, respectively), but can alternatively be represented by a user account or any other suitable representation. The video stream preferably includes a substantially continuous stream of video frames, and the audio stream preferably includes a substantially continuous stream of audio frames. Each audio and video frame is preferably associated with (e.g., encoded with) a timestamp (e.g., the time at which the video frame was generated at the user device or the timestamp of the video frame within a piece of media). Each audio and video frame or stream can additionally or alternatively be associated with a geotag, the originating user identifier, a sentiment tag, a content or keyword tag, or any other suitable metadata. The audio and/or video metadata can be used to determine a chat group relevance to a user, searched to select for a stream of a specific user, or utilized in any other suitable manner. The audio and/or video streams can be tagged by the originating device, by the server, by the receiving device, or by any other suitable component of the system.

A chat group is preferably represented within a chat room by a chat group audio stream and a chat group video stream. A conversation preferably includes the sharing of audio streams, and can additionally include the sharing of video streams or any other suitable content between the users within the conversation. The chat groups of the chat rooms are preferably substantially inclusive, wherein all users within a chat room are preferably capable of simultaneously participating in all chat groups of the chat room. More preferably, all users within a chat room are simultaneously participating in all chat groups to varying degrees. The degree of participation of a user in a chat group is preferably determined based on the priority of the chat group for the user, but can alternatively be automatically determined or based on a user selection or on any other suitable parameter. In one variation of the method, the degree of participation preferably varies proportionally with the chat group priority, wherein the degree of participation is high for a chat group with high priority, and low for a chat group with low priority. A high degree of participation for a user preferably includes the user device playing a discernable audio stream of each participant within the chat group (e.g., the user audio streams have been processed to increase discernibility) and displaying the video stream of each user within the chat group, and wherein the audio stream and video stream associated with the user is continuously displayed to users of the chat group. A medium degree of participation for a user preferably includes the user device playing an audio stream representative of the chat group (e.g., the audio streams of the primary speaker or the audio stream of shared content) and displaying a video stream representative of the chat group (e.g., the video stream of the primary speaker or the video stream of the shared content), wherein the video stream of the user preferably is not continuously displayed to the users within the chat group. A medium degree of participation can alternatively and/or additionally include muffling, decreasing the volume, or otherwise processing the representative audio stream of the chat group to decrease discernibility. A low degree of participation for a user preferably includes the user device playing a substantially muffled or processed audio stream of the chat group, and does not include the user device displaying video associated with the chat group or include consistent display of user video with users of the chat group.

In another variation of the method, the user is capable of participating in a chat group in at least an active participation mode and a passive participation mode. When the user participates in the chat group in the active participation mode (e.g., a high degree of participation), the audio and/or video stream from the associated user device is preferably sent to the devices of the other chat group participants. When the user participates in the passive participation mode (e.g., a low or medium degree of participation), the audio and/or video stream from the associated user device is preferably not sent to the chat group participant devices. However, the user participant can alternatively be operable in any other suitable mode.

Determining the presentation settings for each chat group S100 functions to determine the contribution of each chat group to the audio output at the user device and to determine the display properties of the video stream(s) associated with each chat group. Determining the presentation settings can additionally function to determine a virtual chat group position within a virtual chat room space. The presentation settings for each chat group are preferably specific to each user, but can alternatively the same for all users or for a group of users. Determining the presentation settings preferably includes determining the presentation settings for every chat group within the chat room for the user, but can alternatively include determining the presentation settings for a subset of chat groups within the chat room for the user. The presentation settings of each chat group are preferably determined for each new user and stored at the server or at the native device, but can alternatively be newly determined each time the user accesses the chat room.

The presentation settings are preferably used to determine the target presentation parameter values for each chat group. Presentation parameters preferably include audio parameters and video parameters. Audio parameters include an audio stream selection, the volume of an audio stream, and the discernability of the audio stream (or conversely, the degree of audio stream dampening, muffling, or reduction in intelligibility). Video parameters include a video stream selection, the size of the displayed video stream, and the number of participant video streams displayed. However, any other suitable audio and video parameters can be determined. The presentation parameters can additionally include a virtual chat group position of the chat group relative to a virtual reference point (e.g., the virtual user location). The chat group video is preferably displayed at a position on the user device corresponding to the respective virtual position, and the audio is preferably encoded or mixed to have an aural position corresponding to the virtual position. However, any other suitable presentation parameter can be determined by the presentation settings.

The presentation settings of each chat group for each user are preferably determined by the primary native application, but can alternatively be determined by the server or by the user. The presentation settings are preferably stored and controlled by the server, but can alternatively be managed by the primary native application. The server preferably sets the presentation settings for each chat group based on the respective priorities, and displays each chat group according the presentation settings. The server can additionally control the priority of the chat group for each user. However, the primary native application or any other suitable component can alternatively control the aforementioned parameters. The primary native application or server can additionally adjust the chat group presentation settings in response to a user action. The primary native application or server can additionally map the chat groups to virtual locations within the chat group.

Determining the presentation settings for each chat group preferably includes determining a priority for each chat group for the user and setting the presentation settings for each chat group based on the respective priority. However, determining the presentation settings for each chat group can alternatively include setting the presentation setting to a default setting, setting the presentation settings based on user preferences, setting the presentation settings in accordance with presentation settings received from the user, or determining the presentation settings in any other suitable manner.

Determining the priority of each chat group for the user preferably functions to determine the degree of user interest in the chat group. The chat group priorities can be calculated through scores, ranking assigned on a continuous scale, tiers (e.g., high, medium, and low priority), or any other suitable priority setting. The chat group priorities are preferably determined from user actions performed within the instantaneous session, but can additionally and/or alternatively be determined from a priority selection received from a user, the similarity between the chat group and a user profile associated with the user, the degree of chat group association with one or more user social network connections, historical user actions with the chat group or related chat groups from past sessions, the presence of shared media within the chat group (e.g., as determined based on the source of the audio or video, wherein chat groups having video captured from an API can have higher priority than chat groups with only video from the native camera), the type of media shared within the chat group (e.g., chat groups sharing movies can have higher priorities than chat groups sharing images), the geographic proximity of the audio and video stream to a given physical location (e.g., based on the associated geotags), or from any other suitable user parameter. The chat group priority can alternatively or additionally be determined based on user preferences, based on the user profile, based on similarities between the chat group content and the user interests, a historical relationship between the chat group and the user (e.g., the user had previously visited the chat group), a relationship between the users in the chat group and the user (e.g., a social network connection of the user, as determined from a social networking service, is in the chat group), or based on any other suitable parameter. The user profile is preferably extracted from historical user actions (e.g., include themes or keywords associated with the chat groups that the user has previously participated in), but can alternatively be a profile received from the user (e.g., a profile input by the user), a profile from a third party system (e.g., from a social networking system), or any other suitable user profile.

In one variation of the method, chat groups that the user has explicitly selected (e.g., clicked on with a mouse), or otherwise indicated explicit interest in, preferably have the highest priority. Chat groups in which the user has indicated a passing interest (e.g., the user moused over the chat group video or otherwise transiently selected the chat group) preferably have the second highest priority. Chat groups that are associated with the user, such as those with which the user has interacted in the past, or those that the user could be interested in, preferably have the third highest priority. Chat groups that are within the same chat room, but have not received user action, can have a fourth highest priority. Chat groups can additionally or alternatively be prioritized based on the relevance to the user. For example, chat groups having participants that have low degrees of separation from the user (e.g., along a social graph) can be prioritized higher than chat groups with participants having a high degree of separation from the user. In another example, within a chat group, other participants having low degrees of separation from the user can be prioritized higher than participants having high degrees of separation from the user (e.g., when the user is participating in a chat group with a large number of users, such as a chat group having more than 50 participants).

The chat groups of a chat room are presented according to the respective priorities in response to a user selection of the chat room, wherein the chat groups displayed on the user device have at least a medium priority and chat groups not displayed on the user device have a low priority. In response to a user selection of a first chat group, the chat group priority of the first chat group increases beyond a first threshold and is categorized as a high priority group. The remainder of the chat groups can retain the previous respective chat group priorities, or the respective chat group priorities can be adjusted based on the properties of the selected chat group. For example, chat groups related to the first chat group can increase in priority whereas chat groups unrelated to the first chat group can decrease in priority.

Alternatively, the chat group priority can be assigned based on determined user preferences. User preferences are preferably determined from the themes, keywords, users, or any other suitable parameter of previous actions by the user, wherein chat groups with similar or shared parameters are preferably prioritized higher than chat groups with weaker associations. The user preferences can additionally be predicted based on prior actions through statistical analysis of user activity, correlation of users to persona descriptors (e.g., an abstract user construct used to summarize a group of users), or through any other suitable means of predicting or determining user preferences. The strength of chat group association with the user preferably determines the relative priority of the aforementioned groups. The strength of chat group association with the user is preferably proportional to the frequency of past user actions associated with the chat group (e.g., past participation in the group), strength of parameter associations with the user profile (e.g., degree of similarity between keywords extracted from the chat group conversation and keywords within the user profile, etc.), strength of network connection with the user (e.g., a first degree social network connection, based on a social networking service such as Facebook, is in the chat group), or degree of association of any other suitable user parameter, but can alternatively be inversely proportional, weighted, or otherwise determined. Chat groups that are unassociated with the user preferably have the lowest priority.

The chat group priority can alternatively be determined based on the virtual position of the chat group relative to a virtual user position 6o (e.g., virtual reference position) within the chat room. In this variation, the method preferably additionally includes mapping the chat groups to virtual positions within a virtual space (e.g., the virtual chat room) and determining the chat group priority for each of the chat groups based on the distance between the virtual position of the chat group and a virtual position of the user (e.g., virtual reference point). The virtual chat group positions can be randomly determined, pre-set, set by secondary users, or otherwise determined. The virtual position of the user can be constant within the space (e.g., wherein the virtual space adjusts about the user) or can move within the space. The initial virtual position of the user when the user first enters the chat room is preferably set at a predetermined virtual position, but can alternatively be randomly generated. The user is preferably considered an active participant in a chat group when the virtual user position coincides with the chat group position. However, the chat group priority can be otherwise determined based on the respective virtual chat group position. Alternatively, the chat groups can be mapped to virtual positions within the virtual space based on the respective chat group priority. For example, the chat groups can be mapped such that the distance between the chat group and the virtual reference position varies inversely with the chat group priority (e.g., higher priority chat groups are closer to the virtual reference position and lower priority chat groups are further from the virtual reference position). However, the chat groups can be mapped such that the distance between the chat group and the virtual position varies directly with chat group priority, such that chat groups of a given priority are grouped together, or mapped within the virtual space in any other suitable configuration based on the respective chat group priority. The chat group priority can be otherwise determined using a combination of the aforementioned methods or determined in any other suitable manner.

Determining the presentation settings for a chat group based on the respective chat group priority preferably includes selecting the presentation settings for each of the priorities. Different settings are preferably determined for different priority levels, but the settings can alternatively vary along a substantially continuous continuum for a continuum of priorities. Different priority tiers are preferably associated with a different set of presentation settings. The parameter values for each priority tier are preferably automatically determined by the system (e.g., based on predetermined values, automatically calculated, etc.), but can alternatively be based on values received from the user, values determined from user preferences (e.g., from historical user actions), or otherwise determined. Alternatively, the parameter values for each priority tier can be calculated or otherwise determined based on the chat group priority.

In one variation of the method, the priorities are preferably divided into a high, medium, and low priority tier using a first and a second threshold, wherein each tier has a respective set of presentation settings. For example, chat groups having priorities above a first threshold preferably have a first set of presentation settings, chat groups having priorities between a first and second threshold preferably have a second set of presentation settings, and chat groups having priorities below the second threshold preferably have a third set of presentation settings, wherein the first, second, and third set of presentation settings preferably include different presentation parameter values. However, any suitable number of thresholds can be used, such that the set of chat groups can be divided into any suitable degree of resolution. The thresholds can be predetermined or be dynamically determined by the system. The thresholds can be set or adjusted such that a singular chat group has the highest priority while multiple chat groups can share lower priority rankings. Alternatively, the thresholds can be set or adjusted such that the chat groups all remain within a given priority tier until a user selection is received. However, the threshold can be selected to include any other suitable number of chat groups in any suitable tier bounded by an upper and lower threshold.

Figure 2:
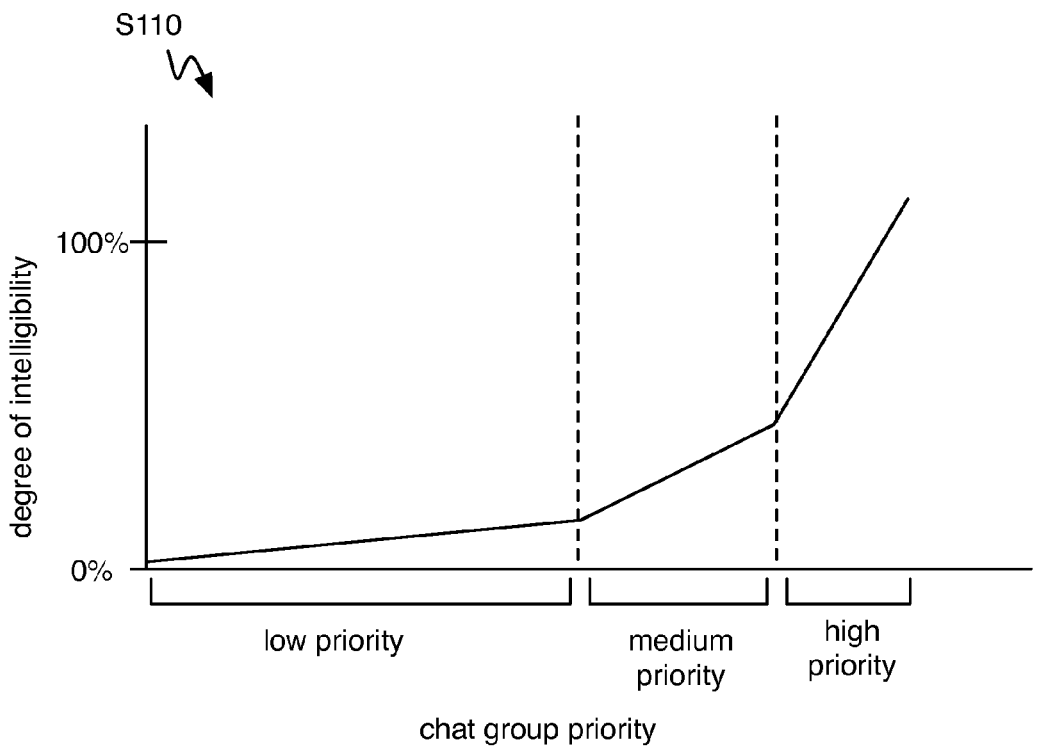
FIG. 2 is a specific example of audio parameter setting determination based on the chat group priority.

Determining the presentation settings based on the chat group priority preferably includes determining the audio settings for each chat group based on the respective chat group priority. Determining the audio settings for each chat group preferably includes determining the discernability of the chat group audio stream. While the audio streams for all chat groups are preferably played to the user, the audio streams are preferably processed to varying degrees to adjust the discernibility of the chat group audio stream, dependent on the chat group priority. The discernibility of the chat group audio streams preferably varies directly with the assigned priorities, wherein the discernability of the chat group audio stream increases with increasing priority (e.g., the highest priority chat groups are preferably the most discernible and the lowest priority chat groups are preferably the least discernible), an example of which is shown in FIG. 2. However, the respective contribution of the chat group audio streams to the audio output can be otherwise determined.

In one variation of the method, the chat group with the highest priority preferably contributes a highly discernible, clear audio stream to the audio output, wherein the audio streams of the users within the chat group are preferably processed to increase discernibility (e.g., reduce noise, increased volume, etc.). The chat groups with medium priority preferably contribute less discernible audio streams to the audio output, wherein the audio streams of the users within these chat groups are preferably muffled, lowered in volume, scrambled, or otherwise processed to decrease discernibility. The chat groups with low priority preferably contribute the least discernible audio streams to the audio output, wherein the audio streams of the users within these chat groups are preferably substantially muffled, lowered in volume, scrambled, or otherwise processed to substantially decrease discernibility (e.g., the discernibility is decreased to a second degree lower than that of medium priority chat groups).

Determining the audio settings for each chat group preferably includes determining the volume of the chat group audio stream. The audio settings can be determined individually for each chat group, or can be determined for a subset of chat groups and applied to the chat group subset. While the audio streams for all chat groups are preferably played to the user, the audio streams are preferably processed to varying degrees to adjust the respective volume of the chat group audio stream, dependent on the chat group priority. The volume of each chat group audio stream preferably varies directly with the assigned priorities, wherein the highest priority chat groups are preferably the loudest (e.g., has the highest amplitude limit) and the lowest priority chat groups are preferably the quietest (e.g., has the lowest amplitude limit). However, the respective contribution of the chat group audio streams to the audio output can be otherwise determined.

In one variation, the chat group with the highest priority preferably contributes an audio stream of a first volume to the audio output. The chat groups with medium priority preferably contribute audio streams at a second volume, less than the first volume, to the audio output. The chat groups with low priority preferably contribute audio streams at a third volume, lower than the second volume to the audio output. Presenting the chat group audio can include selecting a volume limit based on the chat group priority, mixing the constituent audio streams of the chat group into a chat group audio stream, processing the mixed chat group audio stream to meet the volume limit, and playing the processed chat group audio stream at the user device. Alternatively, adjusting the volume of the chat group audio stream can include processing the constituent audio streams to meet the respective volume limit and playing the dampened audio streams at the user device. Alternatively, the dampened audio streams can be mixed into a chat group audio stream 42, wherein the chat group audio stream is played at the user device. The constituent audio streams can be dampened, mixed, and/or muted by the server or by the primary native application, preferably without interruption to other audio streams, but alternatively as a whole with other audio streams. The constituent audio streams are preferably audio streams of the users participating in the chat group that are received from the user devices associated with the participating users (participant audio streams), but can alternatively be an ambient audio stream 32 (e.g., chat room audio stream), an additional sound track 22 retrieved from the server, user device, a third party source, or be any other suitable audio stream. However, any other suitable audio parameter can be otherwise determined based on the respective chat group priority.

Determining the presentation settings preferably additionally includes determining the video settings for each chat group based on the respective chat group priority. Determining the video settings for each chat group preferably includes determining the display properties of the chat group video stream. The display properties can include whether or not the video stream is to be displayed on the user display, the relative size of the chat group video stream on the user display, the number of participant video streams to display, the amount of participant profile data to display, the transparency of the video stream, or any other suitable display property of the video stream. The display properties of video streams associated with each chat group are preferably additionally associated with the priority of the chat group to the user. In one variation, only video streams associated with chat groups above a threshold priority are displayed. In another variation, the size of the displayed video stream is directly proportional to the priority, wherein chat groups with high priority are preferably larger than chat groups with low priority. In another variation, the amount of chat group detail directly varies with the priority, wherein video streams of chat groups with high priority are preferably displayed with a large amount of chat group detail (e.g., all the video streams of all the users within the chat group are displayed, profile details about the users can be displayed, etc.), video streams of chat groups with medium priority are preferably displayed with a low amount of chat group detail (e.g., only the video stream of a single user is shown, only the video stream of the primary speaker is shown, etc.), and video streams of chat groups with low priority are preferably not displayed at all. In another variation, the chat group with the highest priority is preferably displayed proximal the video-capture device (e.g., the camera), wherein chat groups with lower priority are preferably displayed distal the video-capture device. However, the video streams of the chat groups can be otherwise adjusted based on the priority of the chat group to the user.

In a more specific example, the relative size of the chat group displayed on the user device is preferably correlated with the respective chat group priority. For example, the video streams of high priority chat groups (e.g., chat groups having a chat group priority over a first threshold) are displayed larger than the video streams of medium priority chat groups (e.g., chat groups having a chat group priority between a first threshold and a second threshold), and the video streams of low priority chat groups (e.g., chat groups having a chat group priority under a second threshold) are not displayed. The number of video streams of the chat group that are displayed is preferably also dependent upon the respective chat group priority, wherein more video streams of higher priority chat groups than video streams of lower priority chat groups are displayed. For example, all the participant video streams of a high priority chat group are preferably displayed, one participant video stream of a medium priority chat group is preferably displayed, and no video streams of a low priority chat group can be displayed.

Determining the presentation settings for each chat group can alternatively include determining the presentation settings based on a user selection of a parameter value for a chat group. In response to receipt of the user selection of a parameter value for a chat group (e.g., wherein the user increases the size of the video display, increases or decreases the chat group volume, etc.) the received parameter value is preferably stored as the respective parameter setting for the chat group. Using the received user settings as the parameter settings for the chat group can additionally include determining the relative priority of the primary chat group (e.g., chat group that was acted upon) and storing the received parameter value as the respective parameter setting for the respective chat group priority. Using the received user selection as the parameter settings for the chat group can additionally include determining secondary chat groups that are similar to the primary chat group (e.g., includes users having similar interests, includes shared media having a similar media type, includes shared media of a similar topic, etc.) and storing the received parameter value as the respective parameter setting for the secondary chat groups.

Alternatively, the presentation settings for the chat group can be determined based on user preferences, based on the user profile, based on similarities between the chat group content and the user interests, a historical relationship between the chat group and the user (e.g., the user had previously visited the chat group), a relationship between the users in the chat group and the user (e.g., a social network connection of the user, as determined from a social networking service, is in the chat group), or based on any other suitable parameter. The presentation settings for a chat group can additionally or alternatively be determined based on the presentation settings or priority of the chat room that the chat group is located within. However, the presentation settings can be determined using a combination of the aforementioned methods, or determined in any other suitable manner.

Determining the presentation settings for each chat group can additionally include determining the presentation settings based on the respective virtual position of the chat group. The virtual position to which the chat group is mapped preferably determines where the chat group video is displayed on the screen, wherein the chat group is preferably displayed at a position on the screen corresponding to the virtual position of the user within the virtual space. The virtual chat group position can alternatively determine whether the chat group video is to be displayed, the priority of the chat group, or determine any other suitable presentation setting for the chat group. The virtual position of the chat group can additionally determine the aural position of the audio stream within the chat group audio stream (e.g., determines the position that the chat group audio stream is encoded to be played from, such as stereo left or stereo right). The chat group is preferably mapped to a two-dimensional virtual space (e.g., an array), but can alternatively be mapped to a three-dimensional virtual space or a virtual space of any other suitable dimensions. The virtual user position is preferably laterally centered on the user display, but can alternatively be located elsewhere on the user display (e.g., lower right corner).

In one variation of the method, the chat group virtual positions are determined prior to user entry into the chat room, wherein the user is preferably placed in a virtual position that maximizes the relevancy of the chat groups surrounding the user (e.g., maximizes the total priority of the chat groups proximal the user position). In another variation of the method, the chat group virtual positions are individually determined for each user, such that the chat group virtual positions for a first user are different than the virtual positions of the same chat groups for a second user. The virtual proximity of the chat group to the virtual user position preferably varies directly with the chat group priority. In another variation of the method, the chat group with the highest priority is preferably substantially laterally centered in the display and the virtual distance of each of the remaining chat groups from the highest priority chat group are preferably directly related to the difference in respective priority (e.g., medium priority chat groups are closer than low priority chat groups). In another variation of the method wherein there are the two or more high priority chat groups, the two or more chat groups are displayed about (e.g., are substantially centered about) the point on the display indicative of the user position. However, the chat groups can be otherwise displayed.

As shown in FIG. 1, simultaneously presenting a plurality of representative audio and video streams from each of a plurality of chat groups S200 functions to present a user with a plurality of conversations, such that the user can simultaneously access content that is shared within the conversations. More preferably, the display properties of the presented audio and video streams for each chat group are dependent upon the chat group presentation settings that are specific to the user.

Simultaneously presenting a plurality of audio and video streams from each of the plurality of chat groups preferably includes presenting the audio streams from each of the set of chat groups at the user device S220 and displaying the video streams of a subset of the chat groups at the user device based on the respective presentation settings S240. Simultaneously displaying a plurality of audio and video streams from the plurality of chat groups preferably additionally includes receiving the audio and video streams from the user devices associated with each participating user within each chat group (participant audio and video streams, respectively) and synchronizing the audio and video streams. The participant audio and video streams are preferably audio and video streams received from the user devices associated with the participating users of the chat groups, but can alternatively be an ambient audio stream retrieved from the server, user device, or a third party source, or be any other suitable audio stream. The participant audio and video streams can alternatively be received as a single audio stream and single video stream, wherein the constituent participant streams are individually tagged or otherwise identified within the single stream. The participant audio and/or video streams are preferably flattened to decrease bandwidth, but can alternatively be unprocessed or otherwise processed. The participant audio and/or video is preferably flattened by the client on the originating device prior to transmission to the server, but can alternatively be flattened by the server after receipt and before transmission to the final user device, or flattened at any other suitable stage in the method.

Simultaneously presenting the audio streams from each of the plurality of chat groups S220 enables the user to discover new content and users based on audio. Simultaneously presenting the audio streams preferably includes playing all the participant audio streams of all the chat groups, but can alternatively include playing the participant audio streams of a subset of the chat groups. Simultaneously presenting the audio streams from each of the plurality of chat groups preferably includes concurrently playing the audio streams received from each of the user devices associated with chat group participants, wherein the audio streams are processed to varying degrees based on the respective chat group presentation settings. Simultaneously playing the participant audio streams can additionally include concurrently playing an additional sound track 22 selected from the server or from the user device. Simultaneously playing the participant audio streams can additionally include concurrently playing participant audio streams of chat groups in other chat rooms. However, any other suitable audio stream can be played with the participant audio streams of the chat group.

Figure 7:
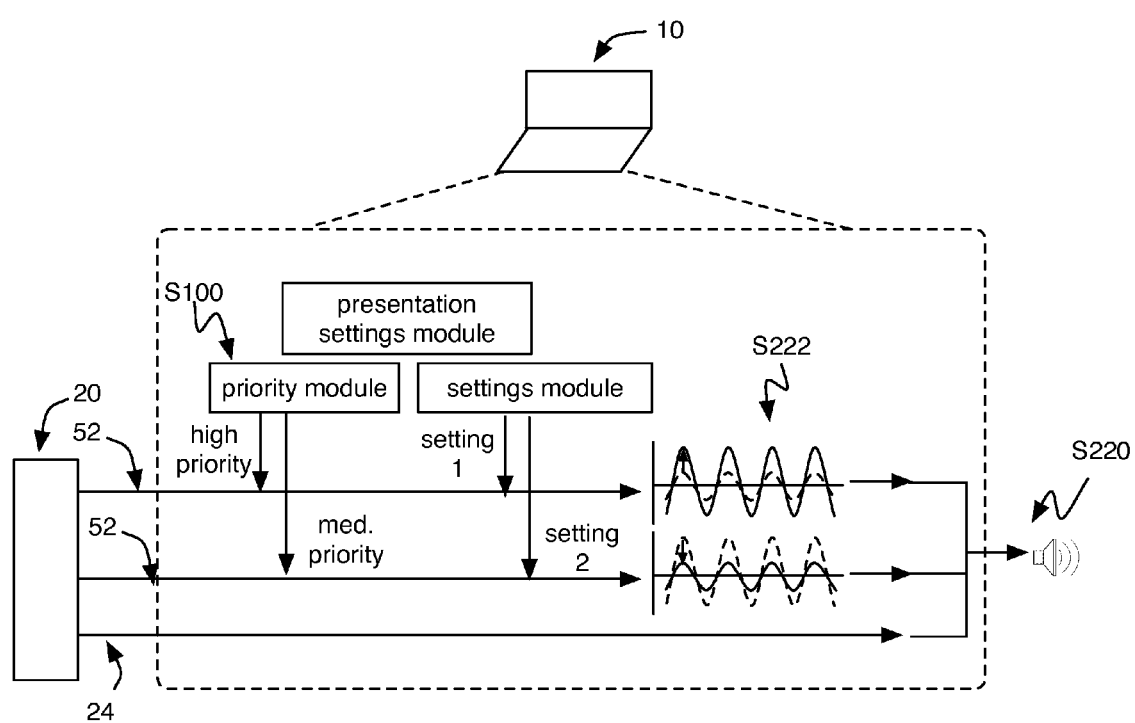
FIG. 7 is a schematic representation of a variation of processing the audio streams.

The participant audio streams can be mixed into the chat group stream S224 at the server or at the primary native application. The participant audio streams can be processed to meet the audio settings at the server or at the primary native application S222, an example of which is shown in FIG. 7. The chat group streams can be mixed into the final stream at the server or at the primary native application. The server preferably mixes all the participant audio streams of all the chat groups into an ambient audio stream and sends the ambient audio stream and the participant audio streams of high priority chat groups to the user device. The server can additionally send participant or chat group audio streams of medium priority chat groups (e.g., chat groups adjacent the user virtual position) to the user device. The server preferably sends the pre-mixed chat group audio stream and/or participant audio stream to the user device in response to a request 16 received from the user device. The request preferably identifies the chat groups for which chat group audio streams and participant audio streams should be sent. The request is preferably generated by the primary native application based on the respective chat group priorities as determined by the primary native application, wherein chat group audio streams are preferably requested for medium priority chat groups and the participant audio streams are requested for high priority chat groups. However, any other suitable audio for a chat group can be requested. Alternatively, the server can determine which audio stream should be sent for the chat group based on the chat group priority (e.g., no audio stream, the chat group audio stream, the participant audio streams, etc.), wherein the server stores the chat group priorities for the user. The server can alternatively send the chat group stream or participant audio streams of all or any suitable chat groups to the user device.

Figure 5:
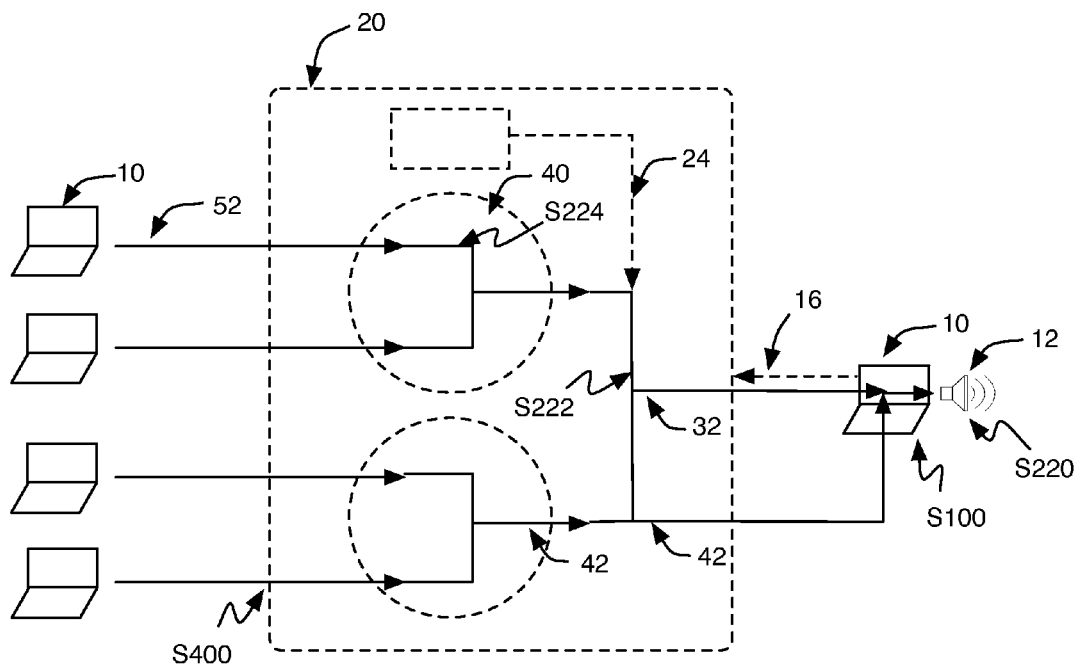
FIG. 5 is a schematic representation of a variation of simultaneously presenting the audio streams of a plurality of chat groups.

Simultaneously presenting the audio streams S220 preferably includes mixing the audio streams received from the user devices of participants within a chat group into a chat group stream, processing the participant audio streams to meet the audio settings for the respective chat group, and mixing the chat group streams into a final stream, an example of which is shown in FIG. 5. Processing the participant audio stream preferably includes dampening the audio stream by an amount or degree determined by the audio setting, and can additionally include adjusting the volume of the audio stream. In a first variation of the method, the participant audio streams are mixed into a chat group stream, and the resultant chat group stream is preferably subsequently processed to meet the audio settings determined for the respective chat group and mixed into the final stream. In a second variation of the method, the participant audio streams can be processed to meet the audio settings for the respective chat group and subsequently mixed into the chat group stream, which is subsequently mixed into the final stream. In a third variation of the method, the participant audio streams of all chat groups of a given priority or tier can be mixed into an aggregate chat group stream, processed to meet the audio settings for the given tier, and mixed into the final stream. In a fourth variation of the method, the participant audio streams can be processed to meet the audio settings for the respective chat group and played at the user device. However, the participant audio streams can be mixed using a combination of the aforementioned methods, or can be otherwise mixed and processed into the final stream.

The final stream is preferably a stereophonic audio stream centered about the virtual user position, wherein the aural position of a chat group audio stream is preferably based on the virtual location of the respective chat group relative to the virtual user location. However, the final stream can be monophonic, or have any other suitable number of channels. Mixing the final stream preferably includes mixing the audio streams of chat groups below a priority threshold into a monophonic ambient track and mixing the audio streams of chat groups above the priority threshold into a stereophonic adjacent track that is subsequently mixed with the ambient track. Mixing the chat group audio streams preferably includes mixing the participant audio streams into a monophonic chat group audio stream, but can alternatively include mixing the participant audio streams into a stereophonic chat group audio stream, particularly when the chat group priority is beyond a priority threshold. The aural positions of the participant audio streams within the stereophonic chat group audio stream are preferably located in front of the user (e.g., wherein the user is assumed to be facing the user device), but can alternatively be arranged about the virtual user position or otherwise positioned. However, the final stream and respective aural positions of the chat group audio streams can be otherwise mixed.

Figure 4:
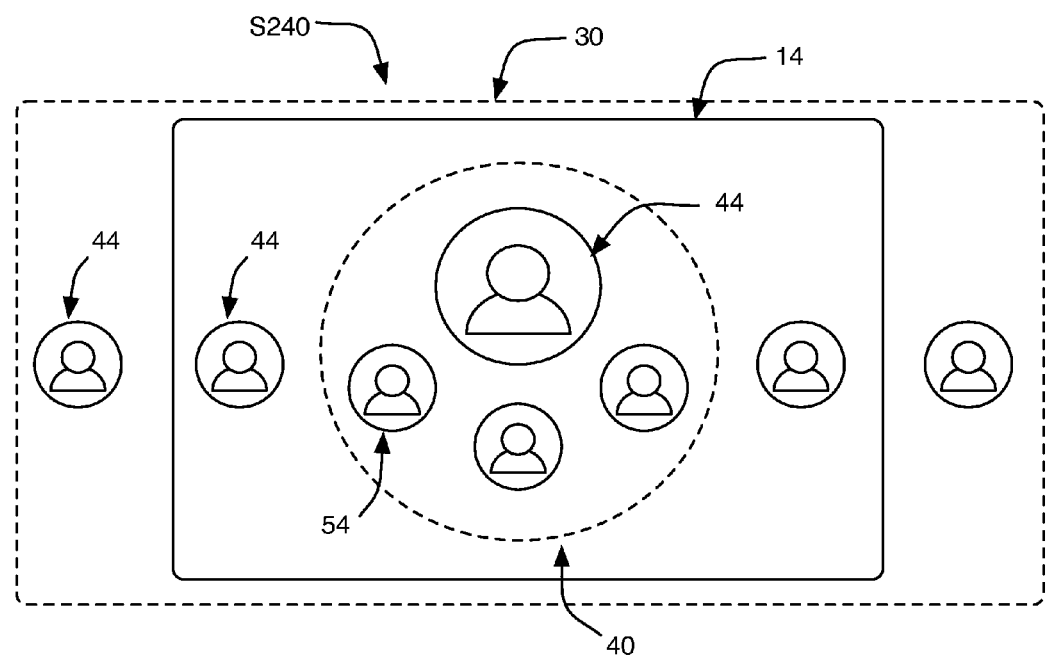
FIG. 4 is a schematic representation of an example of the chat group video stream displayed corresponding to the virtual chat group positions of FIG. 3.

Simultaneously presenting the video streams from each of the plurality of chat groups S240 enables the user to discover new content and users based on video. Simultaneously presenting the video streams preferably includes displaying a subset of the chat group video streams of the chat room, but can alternatively include displaying all the video streams of all the chat groups within the chat room or displaying any other suitable number of chat group video streams, as shown in FIG. 4. Simultaneously presenting the video streams from each of the plurality of chat groups preferably includes concurrently playing a set of chat group video streams based on the presentation settings for the respective chat group. More preferably, simultaneously playing the video streams includes simultaneously playing the video streams of chat groups having priorities beyond a priority threshold. The set of chat groups for which the video streams are displayed is preferably the same set that contribute aurally positioned audio streams to the stereophonic final stream (e.g., as determined by the priority threshold), but can alternatively be a subset of the set or a superset of the set.

Figure 6:
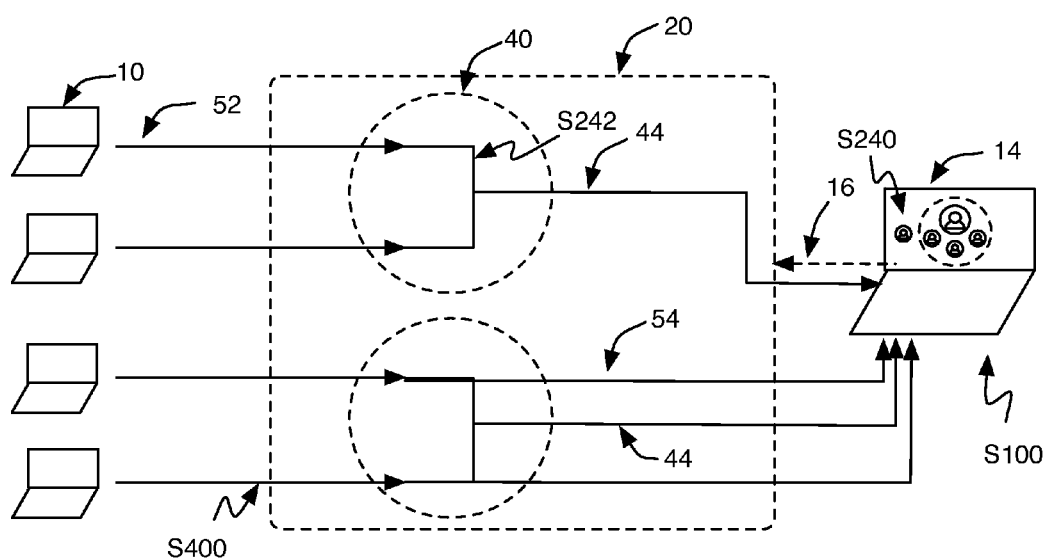
FIG. 6 is a schematic representation of a variation of simultaneously presenting the video streams of a plurality of chat groups.

Simultaneously presenting the video streams from a set of chat groups S240 preferably includes compositing participant video streams into a chat group video stream S242. The chat group video stream is preferably composited by the primary native application, but can alternatively be composited by the server, as shown in FIG. 6. The chat group video stream is preferably individual to a user (e.g., viewer), but can alternatively be generic to a plurality of users. In one variation of the method, the chat group video stream of a first chat group in which the user is a participant (e.g., streaming audio and video to the other participants of the chat group) is individually composited for the user, while the chat group video stream of a second chat group is generic (e.g., appears the same for a second user who is also not a participant in the second chat group). The server preferably sends the chat group video stream and/or participant video stream to the user device in response to a request received from the user device. The request preferably identifies the chat groups for which chat group video streams and participant video streams should be sent. The request is preferably generated by the primary native application based on the respective chat group priorities as determined by the primary native application, wherein chat group video streams are preferably requested for medium priority chat groups and both the participant video streams and the chat group video streams are requested for high priority chat groups. However, any other suitable video for a chat group can be requested. Alternatively, the server can determine which video stream should be sent for the chat group based on the chat group priority (e.g., no video stream, the chat group video stream, both the chat group video stream and the participant video streams, etc.), wherein the server stores the chat group priorities for the user.

Compositing the chat group video stream S242 preferably includes selecting a participant video stream of the chat group and streaming the selected participant video stream as the chat group video stream. Compositing the chat group video stream can additionally include selecting a second participant video stream in response to a switch condition being met and streaming the second participant video stream as the chat group video stream. The selected participant video stream is preferably representative of the user that the other participants of the chat group are focused on (e.g., the user that is speaking), but can alternatively be a video stream of interest to the user (e.g., shared media) or any other suitable video stream. The first participant video stream is streamed as the chat group video stream until the audio stream associated with the second participant video stream satisfies the selection criteria. Upon the second participant audio stream satisfying the selection criteria, the second video stream can replace the first video stream (e.g., with or without a video transition in between) as the chat group video stream, be displayed adjacent the first video stream, or be displayed in any other suitable manner as the chat group video stream. Participant video streams are preferably removed from the chat group video stream when the respective audio stream fails to satisfy the selection criteria.

Selecting a participant video stream preferably includes selecting the video stream based on the respective audio stream. The respective audio stream is preferably the audio stream received from the same user device as the video stream, but can be an audio stream otherwise associated with the video stream. Selecting the participant video stream preferably includes selecting the video stream associated with an audio stream having a volume above a predetermined threshold (e.g., an ambient volume threshold), but can alternatively or additionally include selecting an audio stream having a dominant frequency of a given frequency (e.g., between 1 kHz-4 kHz, alternatively higher or lower), a sustained volume above an ambient volume threshold for more than threshold period of time (e.g., more than 1.3 seconds, 2 seconds, etc.), a consistently increasing volume (e.g., increasing faster than a threshold rate), or any other suitable audio parameter indicative of human speech.

Alternatively, the participant video stream can be selected based on the video stream source. In this variation, different video sources can have different priorities, wherein the participant video streams from high priority video sources are selected over participant video streams from low priority video sources. Video stream sources can include primary video sources, such as an integrated camera of the user device (e.g., the front camera, back camera, etc.) and a camera removably connected to the user device, and secondary sources, such as the API of a native application (e.g., the application rendering the graphics, etc.), a third party source, or any other suitable video source. The video source is preferably determined from metadata or other data encoded within the video stream, but can be otherwise determined. In one variation of the method, secondary video sources have a higher priority than primary video sources. In another variation of the method, the back camera of a device can be prioritized higher than secondary sources, which are prioritized higher than the front camera of a device. However, any other suitable prioritization of video sources can be used.

Alternatively, the participant video stream can be selected based on the number of participants within the chat group. This can be particularly relevant when the user is one of the two users. In particular, when there are two or less users within the chat group, the chat group video is preferably the second video stream, wherein the first video stream is that of the user. However, the chat group video stream for users outside of the chat group can be selected in any suitable manner, such as those described above.

Selecting a first participant video stream as the chat group video stream can additionally include processing the associated first audio stream to increase discernability, such as increasing the first audio stream volume, processing the first audio stream to remove noise, or otherwise processing the first audio stream. Selecting the first participant video stream can additionally include processing the secondary audio streams of the secondary video streams (e.g., video streams of other participants within the chat group) to decrease the discernability, such as decreasing the volume of the secondary audio streams, dampening the secondary audio streams, or otherwise processing the secondary audio streams. However, the secondary audio streams can alternatively be processed in a similar manner as the first audio stream, unprocessed, or processed in any other suitable manner.

Displaying the composite video streams of the chat groups preferably includes displaying the composite video streams of chat groups of the set at positions corresponding to the virtual location of the respective chat group relative to the virtual user location, wherein the virtual user location corresponds to a center of a display of the user device. However, the composite video streams can be randomly arranged or otherwise displayed at the user device.

In one variation of the method, simultaneously presenting the video streams from each of the plurality of chat groups includes selecting a primary chat group having the highest chat group priority of the set, playing the participant video streams of the primary chat group, playing the chat group video stream of the primary chat group, and playing the chat group video streams of adjacent chat groups or chat groups having a chat group priority over a priority threshold.

Simultaneously presenting the audio and video streams from each of the plurality of chat groups can additionally include synchronizing the audio and video streams. Synchronizing the audio and video streams functions to align the audio and video within a predetermined time tolerance. The audio and video streams are preferably synchronized by the server, but can alternatively be synchronized by the primary native application. Synchronizing the audio and video streams can include synchronizing only the participant and chat group video streams that are to be displayed with the respective audio streams, but can alternatively include synchronizing all the participant video streams with the respective audio streams, synchronizing the participant video streams of chat groups having priorities over a priority threshold with the respective audio streams, or synchronizing any other suitable video streams with the respective audio streams.

Synchronizing the audio and video streams preferably includes extracting the timestamp from the audio stream packet, extracting the timestamp from the video stream packet, and determining the difference between the timestamps. Lag is detected when the difference between the timestamps exceeds a predetermined time threshold (e.g., 10 milliseconds, 30 milliseconds, etc.). In response to determination that the video stream is lagging behind the audio stream (e.g., the audio stream timestamp is for a later time than the video stream timestamp), synchronizing the audio and video streams preferably additionally includes dropping (e.g., skipping) video frames until the video timestamp substantially matches the audio timestamp. However, the audio can be paused until the video frame timestamp matches the audio timestamp, or synchronized in any other suitable manner. In response to determination that the audio stream is lagging behind the video stream (e.g., the video frame timestamp is for a later time than the audio stream timestamp), synchronizing the audio and video streams preferably additionally includes freezing the video frames until the audio timestamp substantially matches the video timestamp. However, audio packets can be dropped until the audio timestamp matches the video timestamp, or the audio and video can be synchronized in any other suitable manner.

Figure 8:
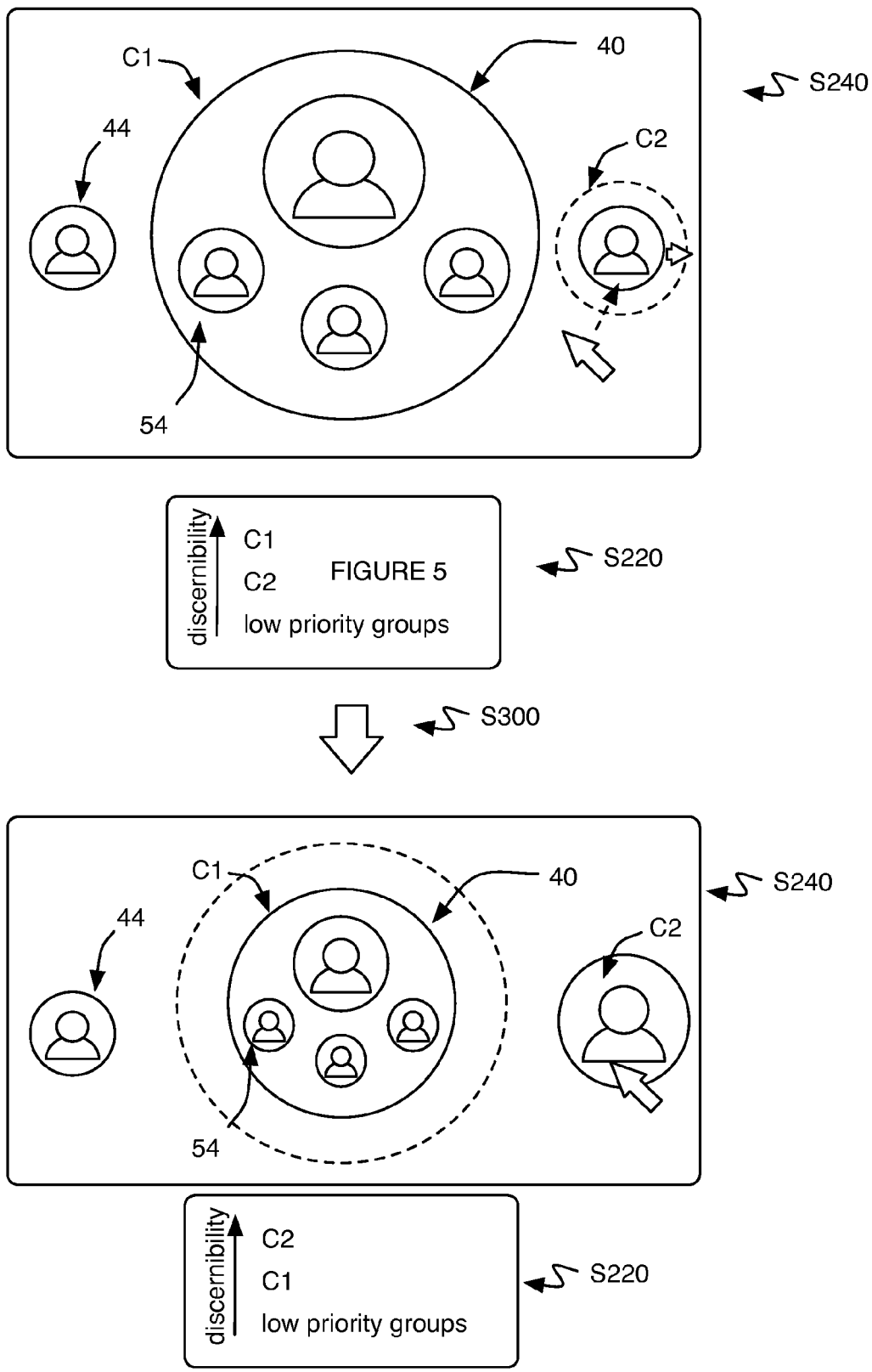
FIG. 8 is a schematic representation of a variation of chat group presentation setting adjustment in response to a transient user selection of a chat group.
Figure 9:
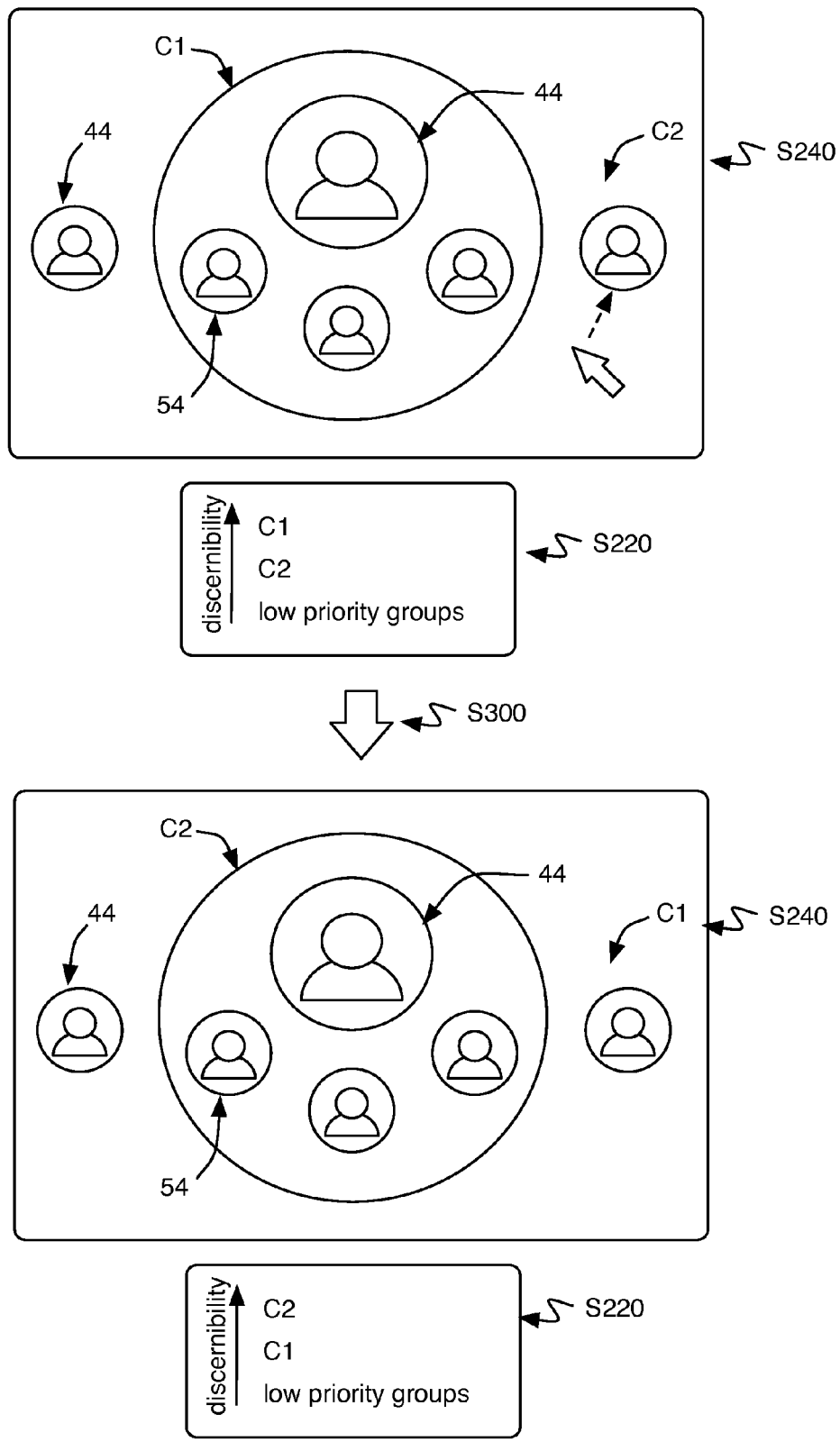
FIG. 9 is a schematic representation of a variation of chat group presentation setting adjustment in response to an explicit user selection of a chat group.

Adjusting a chat group priority in response to a change in user action functions S300 to re-determine the relative chat group priority to the user due to a user action. The chat group priority can additionally be changed in response to a chat room participant action (e.g., other user action). Chat group priority is preferably increased in response to positive user actions, and decreased in response to negative user actions. Positive user actions can include explicit selections (e.g., selecting a chat room icon, such as a video, as shown in FIG. 9), temporary selections (e.g., mousing over a chat room icon, as shown in FIG. 8), selection of a notification, or any other suitable action indicative of user interest. Chat group priority can be increased if the chat group is related to content that is shared by the user, as determined through matching of keywords associated with the chat group and the content or through any other suitable means. Negative user actions can include non-selection of a displayed chat group for a threshold period of time (e.g., the chat group priority is decreased if the user has not explicitly or temporarily selected said chat group in a week), cancelling or hiding of a notification, leaving a chat group within a threshold period of time after joining the chat group, or any other suitable action indicative of user disinterest. Notifications are preferably generated in response to an occurrence of an event of potential interest to the user, such as a movie of potential interest to the user being shown, or a social network connection joining the chat room. The notification preferably links the user to the chat group in which the event occurred, thereby reassigning said chat group to the highest priority. The notification is preferably a pop-up notification, but can be any suitable notification.

The method can additionally include receiving a participant audio and video stream S400. The participant audio and video stream is preferably received from a user device, but can alternatively be received from a third party source, such as a video streaming system. The participant audio and video stream is preferably received by a native application of a second user indirectly from the first user device through the server, but can alternatively be received at the second native application directly from the first user device, received at the server, or received at any other suitable component of the system. Sharing the audio and video from the user device can additionally include capturing the audio and video at the user device.

The method can additionally include capturing the audio and video stream at the user device, which functions to provide a participant audio stream and a participant video stream to the system. The audio and video streams are preferably captured by a native application on the user device but can alternatively be captured by an application executed on a browser or captured in any other suitable manner. The audio and video streams are preferably encoded with a timestamp and can additionally be encoded with the media source, but can alternatively be encoded with any other suitable metadata. The audio and video streams can be encoded by the media source (e.g., camera or microphone), by the user device, by the primary native application, or by any other suitable component of the system.

In one variation of the method, capturing the audio and video stream includes capturing the video stream from a video input device and capturing the audio stream from an audio input device. The video input device is preferably camera, but can alternatively be any other suitable video capture device. The camera can be a camera that is built into the device, or a camera that is connected to the device through a wired or wireless connection. The video stream can be received from one or more video input devices. The video stream is preferably captured by the primary native application (e.g., through the API of the secondary native application rendering the graphics to be shared), but can alternatively be captured at the graphics card and subsequently extracted by the primary native application, or be captured at any other suitable device component. Capturing the video stream can additionally include processing the video stream to improve the apparent definition of video signals.

Capturing the audio stream can include capturing an audio input stream from an audio input device, which functions to capture external audio (audio external from the running applications on the originating device). The audio input stream is preferably an audio stream generated by the user (e.g., voice, music, etc.), but can be any other suitable audio input stream. The audio input stream can be received from one or more audio input devices. The audio input device can be a microphone connected to or integrated within the originating device, an audio input jack, or any other suitable audio input device. The audio input stream is preferably captured by the primary module, but can alternatively be captured by any other suitable module. The audio input stream is preferably sent to the server and subsequently sent to receiving devices, but can alternatively be directly sent to the receiving devices. Capturing the audio input can additionally include processing the audio input stream to cancel the system audio stream echoes from the audio input stream (echo cancellation) prior to sending the audio input stream to the server. Alternatively or additionally, the audio input stream can be processed to cancel the received audio stream echoes from the audio input stream, and can be particularly desirable when no system audio streams are playing. Alternatively or additionally, the audio input stream can be processed to automatically control gain, which functions to substantially maintain the output audio level at a given volume despite fluctuations in the audio input level. Alternatively or additionally, the audio input stream can be processed to de-noise the audio input stream to remove background noise. However, any other suitable filtering mechanism or method can be applied to improve or enhance perceived audio quality. In some variations of the method, the audio parameters for system audio stream playback can be dynamically adjusted based on the captured audio input stream. In one example, when the captured audio input stream is above an amplitude threshold (e.g., the user associated with the originating device is speaking louder than a threshold volume), the volume setting (amplitude) of the system audio stream playback can be decreased. The volume of the system audio stream playback can be reset to the previous volume setting once the captured audio input stream falls below the amplitude threshold.

In another variation of the method, capturing the video and audio stream includes capturing the video and audio of content to be shared. The shared content is preferably any suitable content that can be shared from the user device, and can include content streamed from the internet (e.g., movies from a video hosting site), screenshares (e.g., of a specific portion of the user display can be cropped and shared), one or more native applications (e.g., wherein the view of the primary native application is shared and other portions of the user display are not), or any other suitable content. The audio and video stream of the shared content is preferably captured in response to receipt of a sharing selection received from the user. The sharing selection preferably includes a reference to the content to be shared, such as a reference to a second native application, a selection of a desktop portion, or a reference to a third party source (e.g., a URL). However, the content can be shared in response to the occurrence of any other suitable sharing event.

The shared content can be displayed on the originating user device directly from the graphics and sound card (e.g., directly through the second native application), routed through the primary native application, or sent to and re-received from the server prior to display on the user device (e.g., by the primary native application). The latter variation allows the system to accommodate for display delays between the user device and the participant user devices. Alternatively, the content graphics (e.g., video frames) can be displayed after a predetermined delay. The delay period can be determined by the primary native application based on the substantially instantaneous timestamp of the user device and the timestamps of the most recently received audio or video stream frames, wherein the delay period is preferably approximately the difference between the substantially instantaneous timestamp and the timestamp of the audio or video frame. Alternatively, the delay period can be received by the primary native application from the server, wherein the server can estimate the delay period. The delay period can be estimated by the server based on the network connectivity parameters of the originating and secondary user devices, based on the difference between the encoded timestamp of the most recently received audio or video frame (e.g., packet) and substantially instantaneous time of receipt, or based on any other suitable parameter indicative of a delay between data transmission and receipt at the primary and secondary user devices. However, the content can be presented at any other suitable time.

Sharing content preferably includes capturing the video stream of the content. The video stream is preferably captured by a video sharing system. The video sharing system preferably additionally includes a video capture module that captures the video stream of a running application or a stream of screen images of the device.

The video stream is preferably captured from a second native application executed on the user device. Capturing the video stream from the second native application preferably includes accessing the second native application through an application programming interface provided by the primary native application or by the operating system (e.g., a specific API, Open GL, or any other suitable interface) and capturing the video, images, or any other suitable graphics rendered by the second native application.

Alternatively, capturing the video stream of the content includes capturing a series of screenshots of the user desktop or screen. The series of screenshots can be captured by a digital frame superimposed over a portion of the user device desktop, wherein the digital frame captures and sends any images within the frame to the primary native application. The digital frame is preferably defined by the user, but can alternatively be automatically defined and positioned by the user.

Alternatively, capturing the video stream of the content includes accessing the graphics card, rerouting the content graphics output (e.g., the graphics for the second native application) to the primary native application, and sending the graphics output to the server.

Figure 10:
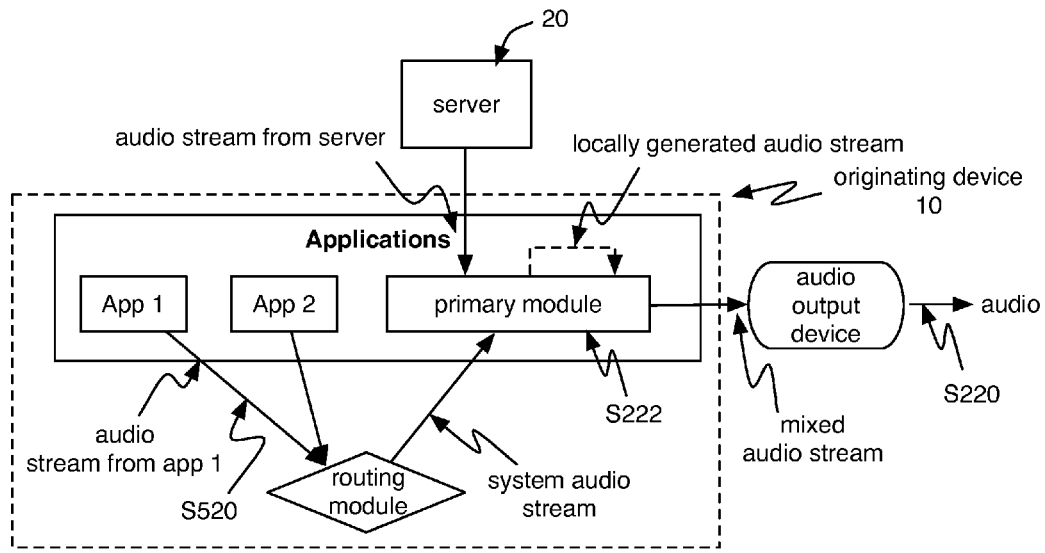
FIG. 10 is a schematic representation of the method of audio sharing.

Capturing the audio and video of content to be shared preferably includes capturing the audio stream of the content S520, as shown in FIG. 10. Capturing the content audio stream is preferably performed by an audio sharing system including a primary module and a routing module. The audio sharing system is preferably part of the video sharing system, but can alternatively be a stand-alone system. The audio sharing system is preferably a native application stored and installed on the device, but can alternatively be a web application (e.g., browser based application) or any other suitable application. The primary module of the audio sharing system preferably functions to receive the captured audio stream from the routing module, to receive one or more audio streams from a server or to locally generate one or more audio streams, to mix the captured audio stream with one or more audio streams received from the server, to play the mixed audio stream through the selected audio device, and to store the audio device selection. However, the primary module of the audio sharing system can additionally perform any other suitable functions. The routing module of the audio sharing system preferably functions as a virtual pass-through audio component that captures the audio output of running applications on the device and passes the captured audio to the primary module. The routing module can additionally store user audio settings (e.g., volume level, playback mode, etc.). However, the routing module of the audio sharing system can function to perform any other suitable audio capture functions, such as audio filtering (de-noising, signal processing, etc). The routing module is preferably run in response to the detection of a trigger event, such as a receipt of a video or audio share indicator (e.g., selection of a share button), and is preferably shut off once a shutoff event is detected, such as the end of a the shared video, the end of an audio track, or the receipt of an end sharing indicator. However, the routing module can run continuously during primary module operation, or run at any other suitable time.

Capturing the system audio stream S520 preferably functions to capture substantially unaltered audio streams from the applications running on the originating device. The system audio stream is preferably captured with routing module, wherein the audio streams of the running applications are preferably rerouted from the default audio output (e.g., the audio device of the device) to the routing module. The routing module preferably passes each captured audio stream in an unaltered form to the primary module. Alternatively, the routing module can mix the disparate audio streams into a captured audio stream. In one variation of the method, capturing the system audio stream includes detecting a pre-assigned audio output device, saving the audio parameters (e.g., volume level and mute state) for the pre-assigned audio output device to the routing module, assigning the routing module as the audio output for the device, and assigning the pre-assigned audio output device to play the mixed audio stream from the primary module. The pre-assigned audio output device can be selected by the user or be a default audio output device. The audio parameters can be selected by the user or be default audio settings (e.g., volume level, mute state, etc.). In response to the receipt of a change in the audio parameters (e.g., received from a user or another application on the originating device), the audio parameters stored in the routing module are preferably changed. The audio parameter changes are preferably applied at the audio output device, wherein the mixed audio stream is preferably synchronized with the audio parameters at the audio output device. In response to receipt of a change in the selected audio output device (e.g., as received from a user), the audio output of the primary module is preferably reassigned to the newly selected audio output device.

Figure 11:
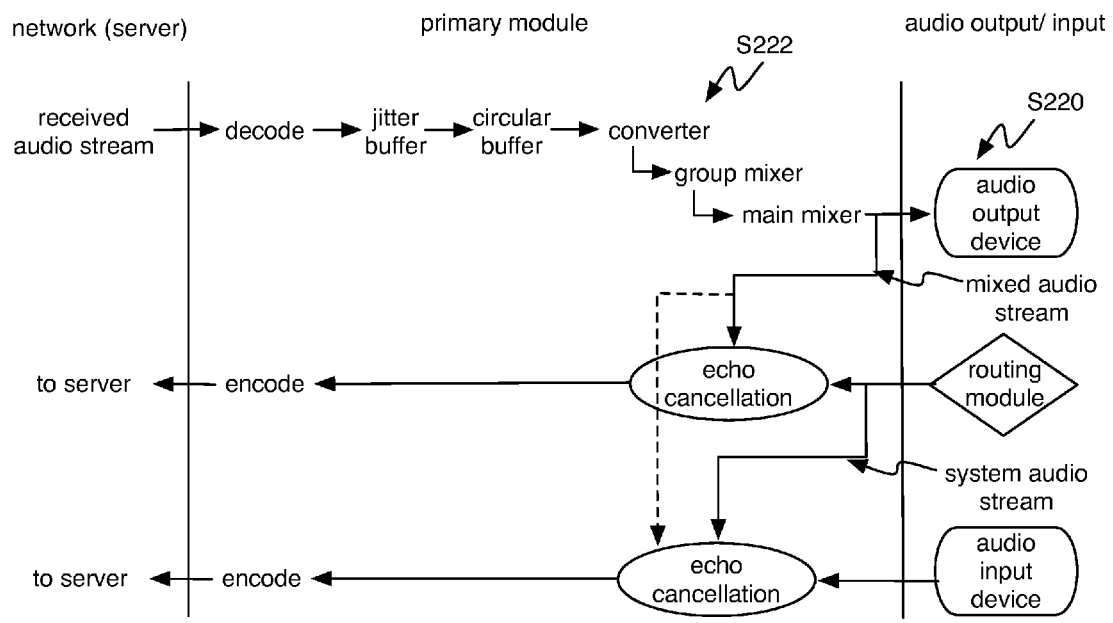
FIG. 11 is a schematic representation of a variation of the method of audio sharing including capturing audio input.

Generating a mixed audio stream from the system audio stream functions to produce an audio stream for the chat group associated with the originating device. The mixed audio stream is preferably generated by the primary module, wherein generating the mixed audio stream further includes sending the primary module the captured system audio stream by the routing module. Generating a mixed audio stream preferably includes receiving an audio stream from the server at the primary module and mixing the received audio stream with the system audio stream at the primary module, such that the mixed audio stream includes the system audio stream and the received audio stream. The received audio stream is preferably the system audio stream from a second originating device (e.g., wherein the first originating device functions as the receiving device), but can alternatively be an audio track saved on and sent by the server. The system audio stream can additionally or alternatively be mixed with a saved audio track (e.g., an ambient noise track) that is saved on the originating device. As shown in FIG. 11, generating the mixed audio stream can additionally include decoding the data for the received audio stream, buffering the data for the received audio stream (e.g., jitter buffer and circular buffer), converting the received data for the received audio stream into an audio stream, mixing one or more received audio streams and the system audio stream with a group mixer, and/or mixing the resultant audio stream with the audio preferences, which are preferably received or retrieved from the routing module. The mixers can be stereo mixers, multichannel mixers, or any other suitable mixer.

As shown in FIG. 10, playing the mixed audio stream through an audio output device preferably functions to play the mixed stream through the audio output device of the originating device. As previously mentioned, the mixed stream preferably includes the system audio stream and the audio stream received from the server (e.g., a second system audio stream from a second originating device, audio input from the second originating device, etc.). Playing the mixed audio stream through the audio output device preferably includes applying the audio parameters to the mixed audio stream and sending the mixed audio stream to the selected audio output device. Alternatively, the mixed audio stream and the audio parameters can be sent to the audio output device, wherein the audio output device applies or synchronizes the audio parameters to the mixed audio stream.

Capturing the audio stream can additionally include sending the system audio stream of the originating device to a server. The server can be the same server from which the audio stream is received, but can alternatively be a different server. The system audio stream is preferably sent by the primary module to the server, but can alternatively be sent by the routing module. Sending the system audio stream to the server preferably additionally includes processing the system audio stream to cancel mixed audio stream echoes (e.g., echoes from the audio stream received from the server) prior to sending the system audio stream to the server.

Figure 12:
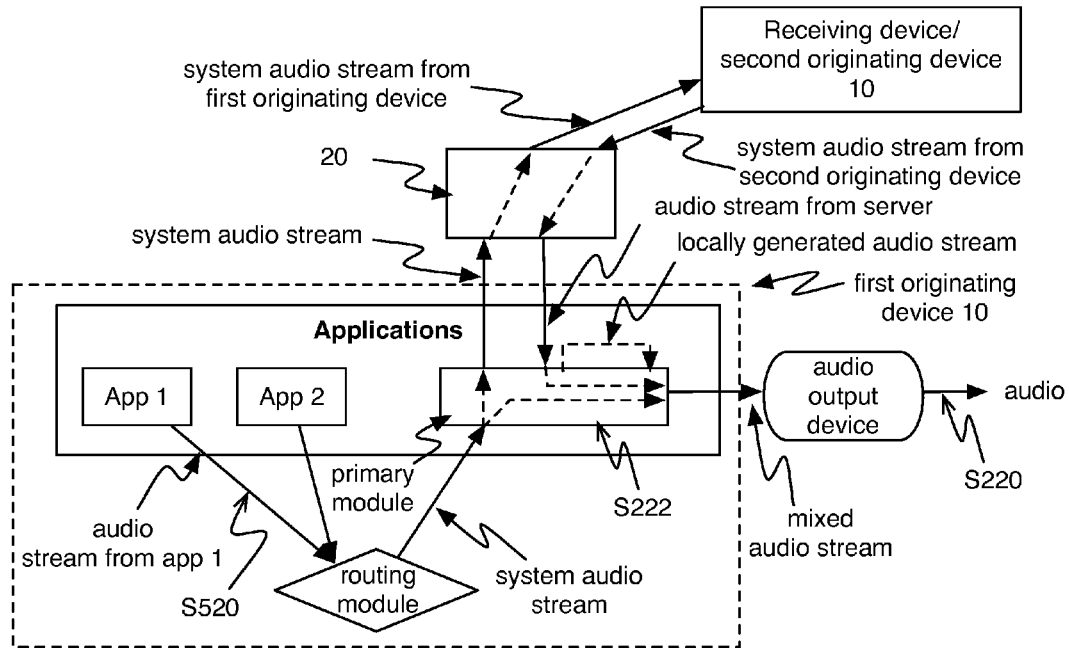
FIG. 12 is a schematic representation of a variation of the method of audio sharing including substantially immediate playback of the system audio stream at the originating device.

In one variation of the method as shown in FIG. 12, sending the system audio stream of the originating device to the server includes sending the system audio stream to the server before, after, or simultaneously with system audio stream playback through the audio output device of the originating device.

Figure 13:
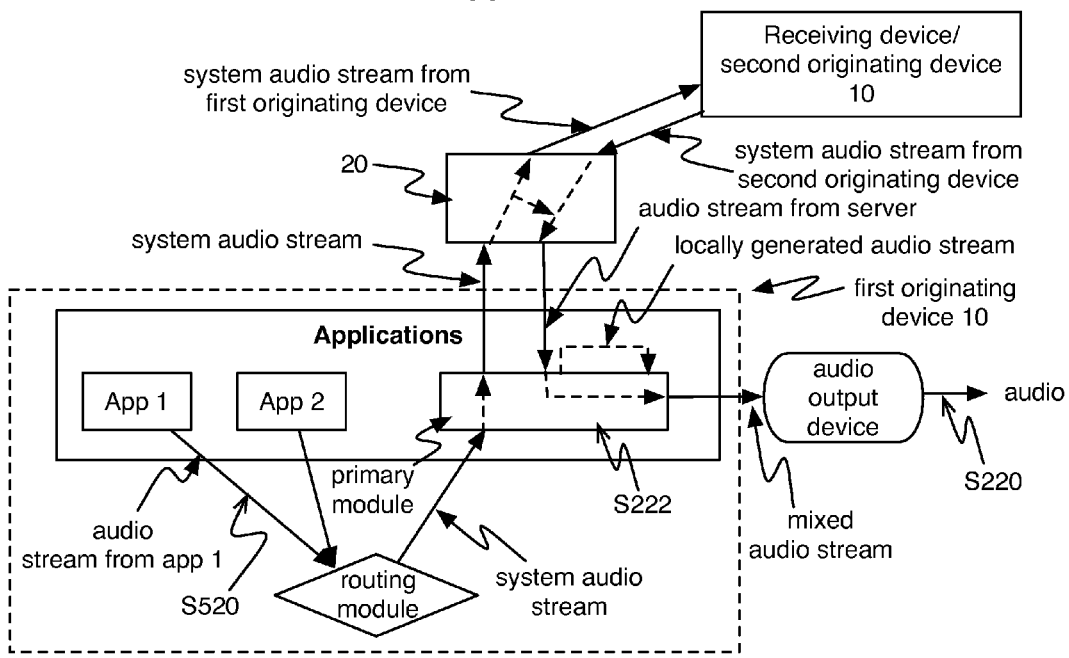
FIG. 13 is a schematic representation of a variation of the method of audio sharing including delayed playback of the system audio stream at the originating device.

In another variation of the method as shown in FIG. 13, the system audio stream is sent to the server after capture, is sent back by the server to the primary module as a portion of the audio stream, and is played through the audio output device after receipt, such that the sharing audio additionally includes sending a system audio stream of an originating device to a server and receiving an audio stream including the system audio stream from the server. This variation can function to accommodate for the delay in system audio stream playback between the originating device and the receiving device, as the originating device and receiving device will receive and subsequently play the system audio stream (from the originating device) at approximately the same time. In this variation, the primary module can synchronize latencies between the originating and receiving devices, wherein the audio and/or video streams received from the server preferably include metadata that enables synchronization. Alternatively, the server can additionally synchronize latencies between the originating and receiving devices, and can dynamically adjust for delays such that the originating device and receiving device receive and/or play the audio streams at substantially the same time. The video sharing system can additionally function to delay the video playback on the originating device to substantially match the delay on the system audio stream playback.

Alternatively, the audio of an application can be individually captured and sent to the server. In this variation of the method, the primary native application can access the audio of the secondary native application through the application programming interface of the secondary native application. Alternatively, the primary native application can access the sound card or graphics card and reroute the audio associated with the secondary native application to the primary native application, server, and/or audio output. However, the content audio can be otherwise captured and shared.

Sharing content can additionally include sharing content from a third party source. The third party source is preferably a video hosting system, such as YouTube or Vimeo, but can alternatively be any other suitable content hosting system. The shared content preferably replaces the audio and video stream of the user, but can alternatively only replace the audio and video stream of the user within the chat group video stream, be streamed in addition to the audio and video stream of the user, be streamed as an additional participant in the chat group, or be otherwise presented to the chat group participants. Sharing content from a third party source preferably includes receiving a sharing request including a link or reference to the third party source, receiving the referenced content from the third party source at the server or the native application, and streaming the content to the participant user devices.

Sharing content from the third party source can additionally include receiving a sharing request from the user at the server or user device, wherein the sharing request includes a link or reference to the third party source, sending the reference to the participant user devices of the chat group by the server or user device, and sending a synchronization timestamp to the participant user devices of the chat group by the server or user device. The participant user devices receive the referenced content from the third party source, and use the synchronization timestamp to determine the substantially current play position. The synchronization timestamp can be the time at which the content should start playing, or can be the content timestamp of the current play position. In the latter instance, the server or the primary native application of the originating user can track the current play position or estimate the current play position. In one variation, the primary native application of the originating user device tracks the current play position or any media action selections (e.g., pause, fast forward, rewind, etc.) and sends the current play position or media action selection and the corresponding device time to the server. The current play position can be sent at a predetermined frequency or in response to a request received from the server (e.g., wherein the server sends the request in response to a monitoring event occurrence, such as the entry of a new user to the chat room or group). The media action selection can be sent in response to media action selection receipt, can be sent at a predetermined frequency, or can be sent in response to any other suitable event. In another variation, the server estimates the current play position based on the duration from the start time. However, the synchronization timestamp can alternatively be determined in any other suitable manner. Content from a third party source can be shared in any other suitable manner.

An alternative embodiment preferably implements the above methods in a computer-readable medium storing computer-readable instructions. The instructions are preferably executed by computer-executable components preferably integrated with a communication routing system. The communication routing system may include a communication system, routing system and a pricing system. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

We claim:

1. A method for sharing media within a chat group at a user device, comprising:
   in response to receipt of a sharing selection from a user at a device, routing an audio output from a default audio output of the device to a virtual audio module;
   receiving a primary audio stream generated by an application executed on the device at the virtual audio module;
   sending the primary audio stream to an external server system by the virtual audio module for distribution to secondary user devices;
   receiving a secondary audio stream from the external server system;
   mixing the primary audio stream and the secondary audio stream into a final audio stream; and
   playing the final audio stream at the default audio output of the device.

2. The method of claim 1 further comprising processing the secondary audio stream to meet audio settings selected based on a priority associated with the secondary audio stream, wherein mixing the primary audio stream and the secondary audio stream into a final audio stream comprises mixing the primary audio stream and the processed secondary audio stream into a final audio stream.

3. The method of claim 2, wherein receiving the secondary stream comprises receiving an ambient audio stream and the participant audio streams from the server, the participant audio streams received from the secondary devices, wherein the participant audio streams are each associated with one of a plurality of chat groups, wherein each chat group comprises a chat group priority for the user, wherein mixing the primary audio stream and secondary audio stream comprises processing each participant audio stream based on the respective chat group priority and mixing the participant audio streams with the primary audio stream into the final audio stream.

4. The method of claim 3, wherein processing each participant audio stream based on the respective chat group priority comprises increasingly attenuating the participant audio stream with decreasing chat group priority.

5. The method of claim 3, wherein each chat group further comprises a virtual position within a virtual space, wherein processing each participant audio stream further comprises mixing the participant audio streams to have aural positions corresponding with the respective chat group virtual position, wherein the final audio stream comprises a stereophonic audio stream.

6. The method of claim 1, further comprising delaying primary audio stream playback by a delay period.

7. The method of claim 6, further comprising determining the delay period at the device based on a substantially instantaneous timestamp of the device and a timestamp of the received secondary audio stream.

8. The method of claim 6, further comprising receiving a delay period from the server, the delay period estimated from network connectivity parameters of the secondary user devices.

9. The method of claim 1, further comprising:
at the device, capturing a primary video stream rendered by the application executed on the device; and
sending the primary video stream to the external server for distribution to the secondary user devices.

10. The method of claim 9, further comprising:
receiving a secondary video stream from the external server, the secondary video stream corresponding to a subset of the secondary audio stream;
synchronizing the secondary video stream and the secondary audio stream; and
concurrently displaying the primary video stream and secondary video stream at a display of the device.

11. The method of claim 10, wherein synchronizing the secondary video stream and the secondary audio stream comprises skipping video frames until a timestamp of an instantaneous video frame substantially matches a timestamp of a given audio frame.

12. The method of claim 9, wherein capturing the primary video stream rendered by the application comprises extracting the primary video stream from the application through an application programming interface for the application.

13. The method of claim 9, wherein capturing the primary video stream rendered by the application comprises accessing graphics rendering instructions for the application at the graphics card.

14. The method of claim 1, further comprising in response to detection of a shutoff event, restoring the audio output to the default audio output.

15. A method for sharing media at a user device, comprising:
receiving a reference to media stored on an external media server at a primary user device;
sending the reference to a chat server;
receiving, from the chat server, a media timestamp corresponding to a given time;
within a threshold period from the given time, streaming an audio and video frame of the referenced media corresponding to the media timestamp from the external media server;
receiving a chat group audio stream from the chat server;
processing the chat group audio stream to meet audio settings selected based on a chat group priority associated with the chat group audio stream;
mixing the audio frame with the processed chat group audio stream into a final audio stream; and
playing the final audio stream at the primary user device.

16. The method of claim 15, wherein the media timestamp and the given time comprise a start time and a timestamp of a first audio and video frame of the media.

17. The method of claim 15, further comprising:
recording a substantially instantaneous timestamp of the media and the substantially instantaneous time at the primary user device; and
sending the recorded timestamp and time to the chat server at a predetermined frequency.

18. The method of claim 15, wherein processing the chat group audio stream comprises dampening the chat group audio stream.

19. The method of claim 15, further comprising receiving a secondary video stream from the chat server and concurrently displaying the secondary video stream with video of the referenced video.

20. A method for sharing media at a user device, comprising:
in response to receipt of a sharing selection from a user at a device, rerouting an audio output from a default audio output of the device to a virtual audio module;
capturing a primary audio stream generated by an application executed on the device with the virtual audio module;
extracting a primary video stream generated by the application with a video module;
sending the primary audio stream and the primary video stream to an external server from the virtual audio module and the video module, respectively, for distribution to secondary user devices;
receiving a secondary audio stream and a secondary video stream from the external server; and
concurrently playing the primary audio stream, primary video stream, secondary audio stream, and secondary video stream at an audio output of the device.

* * * * *